United States Patent
Gutiérrez, Jr. et al.

(10) Patent No.: US 6,777,831 B2
(45) Date of Patent: Aug. 17, 2004

(54) ELECTROCHEMICAL PROCESSING POWER DEVICE

(75) Inventors: Enrique Gutiérrez, Jr., Highland Ranch, CO (US); Bonifacio Diaz, El Paso, TX (US)

(73) Assignee: TecNu, Inc., Highlands Ranch (*) Notice: Subject to any disclaimer, the term of this patent is extended or adjusted under 35 U.S.C. 154(b) by 314 days.

(21) Appl. No.: 09/982,534

(22) Filed: Oct. 18, 2001

(65) Prior Publication Data

US 2002/0070117 A1 Jun. 13, 2002

Related U.S. Application Data

(60) Provisional application No. 60/241,341, filed on Oct. 18, 2000.

(51) Int. Cl.[7] .............................................. H01F 27/42
(52) U.S. Cl. ......................... 307/412; 307/413; 205/80; 204/450; 323/224; 323/285
(58) Field of Search ................................ 323/224, 285; 205/80; 204/450; 307/412–413

(56) References Cited

U.S. PATENT DOCUMENTS

| | | | |
|---|---|---|---|
| 3,707,594 A | | 12/1972 | Ichikawa |
| 4,009,091 A | * | 2/1977 | Washington et al. ...... 204/229.3 |
| 4,438,498 A | | 3/1984 | Sekel et al. |
| 4,517,059 A | | 5/1985 | Loch et al. |
| 4,863,579 A | | 9/1989 | Asaoka |
| 4,935,865 A | | 6/1990 | Rowe et al. |
| 5,273,642 A | | 12/1993 | Crites et al. |
| 5,414,209 A | | 5/1995 | Morita |
| 5,425,297 A | | 6/1995 | Young, Jr. |
| 5,430,242 A | | 7/1995 | Morita |
| 5,486,280 A | | 1/1996 | Bullock, IV et al. |
| 5,736,370 A | | 4/1998 | Zhao et al. |
| 5,739,456 A | | 4/1998 | Shimada |
| 5,917,719 A | | 6/1999 | Hoffman et al. |
| 6,229,292 B1 | * | 5/2001 | Redl et al. ................... 323/285 |
| 6,396,137 B1 | * | 5/2002 | Klughart ..................... 257/691 |

FOREIGN PATENT DOCUMENTS

| | | |
|---|---|---|
| EP | 0 377 538 A2 | 7/1990 |
| EP | 0 632 570 A2 | 1/1995 |
| EP | 0 767 528 A2 | 4/1997 |
| JP | 06051760 | 5/1994 |

OTHER PUBLICATIONS

Faraday Technology, Inc. newsletter, distributed at a trade show on Jan. 25, 1999.

* cited by examiner

Primary Examiner—Robert DeBeradinis
(74) Attorney, Agent, or Firm—Marshall, Gerstein & Borun LLP

(57) ABSTRACT

The present invention discloses a power supply device, particularly for supplying a controlled electrical signal in an electrochemical process, e.g., plating, etching, etc. The power delivery device provides an electrical signal with optimal characteristics and setting for processing one or more surfaces in an electrochemical process. The power delivery device comprises a power stage having an input for receiving a power signal and an output being operably connected to the object. A sensor is operably connected to the output. A controller is operably connected to the output and responsive to the sensor. A modulator is operably connected between the controller and the power stage wherein the power stage outputs the electrical signal to the object in response to the modulator and the controller.

8 Claims, 5 Drawing Sheets

Controlled Ripple on DC

Controlled Ripple with DC
Lower freq. Higher amplitude

Controlled Ripple with Pulse
Periodic Pulse &
Controlled Ripple

Controlled Ripple with Pulse
Pulse Reverse &
Controlled Ripple

Decreasing amplitude gradient

Increasing amplitude gradient

Decreasing frequency gradient

Increasing frequency gradient

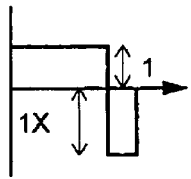
FIG. 9
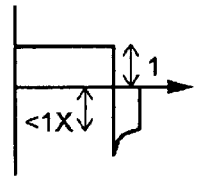
FIG. 10
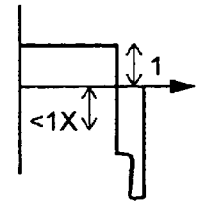
FIG. 11
FIG. 12
Constant Voltage Constant Current
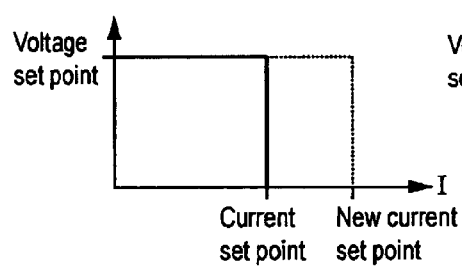
FIG. 13
Constant Power Power Supply
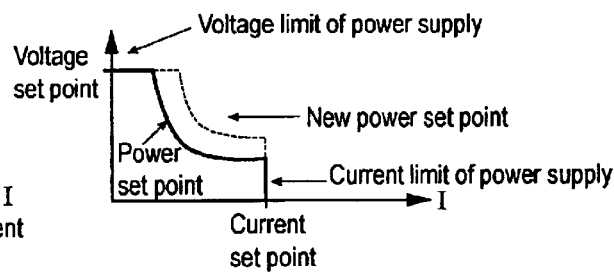
FIG. 14
Dynamic Power Mode
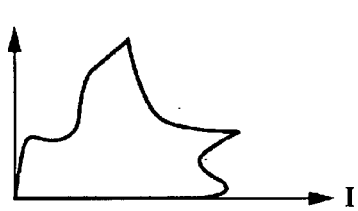
FIG. 15
Dynamic Power Mode
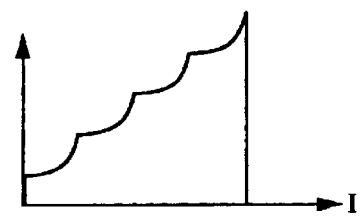
FIG. 16
Dynamic Power Mode
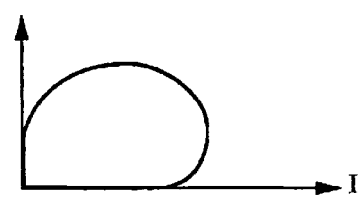
FIG. 17
Dynamic Power Mode
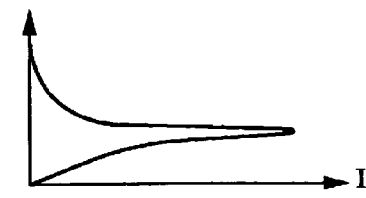

Dynamic Power Mode
Pulse Reverse Example 1

Dynamic Power Mode
Pulse Reverse Example 2

ELECTROCHEMICAL PROCESSING POWER DEVICE

RELATED APPLICATIONS

This application claims the benefit of U.S. Provisional Application No. 60/241,341, filed Oct. 18, 2000.

TECHNICAL FIELD

The present invention relates to power delivery devices, and more particularly to a power supply that delivers controlled electrical signals for use in electrochemical processes, including material deposition and removal.

BACKGROUND OF THE INVENTION

Various processes for depositing and removing material, i.e., plating and etching, are known. For example, chemical plating involves plating via chemical reaction. In this type of chemically mediated process, the plating is controlled via control of the chemical reaction during the plating process. While this process tends to provide a robust plating, it also provides a lesser degree of control over the plating process. Furthermore, EPA regulations make this type of processing more costly and complex because the purely chemically mediated plating process requires controlling large quantities of EPA-regulated chemicals.

Electrical plating, or electrolytic plating, involves providing a potential across the object to be plated while the object is in contact with the plating material. This can be done, for example, by submersing the object within a bath of plating material. The plating material builds up upon the object due to the electrical potential at the outer surface of the object. However, because a greater build-up of electrical charge occurs at these locations, the plating tends to build up around edges and sharp protrusions in this type of process. The more irregularly shaped the object, the more difficult it is to apply a uniform layer of plating. Furthermore, the effective depth of the plating on the object is also limited by this process. While this type of process tends to be more controllable than chemical plating processes, it is still somewhat limited by complex geometry of the object that is difficult to reach during processing.

Due to the drawbacks of the aforementioned plating processes, electrochemical plating has gained increased acceptance. This process combines the benefits of controllability of electrolytic plating and the quality of chemical plating. Electrochemical processing includes electroplating, deposition by electrochemical means, electromachining, etching by electrochemical means and anodizing. Since the process also relies on electrolytic plating, lesser quantities of chemicals are required to effectuate the plating process. However, control of the electrical characteristics of the plating process has become increasingly important.

Control of the electrochemical plating process can be achieved through control of the power supply signal to the plating electrodes. Due to increasing complexity of objects requiring plating, particularly in the micro-electronics industry, the need for power supplies allowing for precise control over the signals produced has grown. Signals that produce pulses having varying positive and negative magnitudes are needed to gradually build up metal layers on surfaces, and to remove excess build-up in problematic areas are a necessity. Furthermore, more precise control and optimization of the electrical signal can help overcome limitations of specific process conditions including, but not limited to chemistries between two or more substances, current, voltage, power, and impedance.

Therefore, there is a need for a power supply device that optimizes the resulting plating of an object during the electrochemical plating process while also offering precise control of the plating process through control of electrical signals produced by the power supply.

SUMMARY OF THE INVENTION

The present invention is directed to a power supply device, particularly for supplying a controlled electrical signal in an electrochemical process. One embodiment of the present invention is a power delivery device providing an electrical signal in an electrochemical process involving an object. The power delivery device comprises a power stage having an input for receiving a power signal and an output being operably connected to the object. A sensor is operably connected to the output. A controller is operably connected to the output and responsive to the sensor. A modulator is operably connected between the controller and the power stage wherein the power stage outputs the electrical signal to the object in response to the modulator and the controller.

Another aspect of the present invention is directed to a power delivery device for providing an electrical signal for an electrochemical process wherein an object is operably connected to the power delivery device. The power delivery device comprises a tracking power stage being operably connected to the object. An output power stage provides the electrical signal to the object. The output power stage is operably responsive to the tracking power stage wherein a dynamic power dissipated by the output power stage is minimized.

In another aspect of the invention, a power supply device is provided that generates a controlled AC "ripple" content on a DC signal for the purpose of electrochemical processing.

In another aspect of the invention, a device is provided that modulates and controls the power signal in a constant power mode or a dynamic power mode, in addition to constant voltage/constant current mode, for the purpose of electrochemical processing.

In yet another aspect of the present invention, a device is provided that utilizes one or more digital signal processors (DSP) for the purpose of controlling and/or modulating an electrical signal based on a feedback signal from one or more sensors of a plating or etching apparatus for the purpose of real-time operation, e.g., control, of an electrochemical processing.

Other features and advantages of the invention will be apparent from the following specification taken in conjunction with the following drawings.

BRIEF DESCRIPTION OF THE DRAWINGS

FIG. 9 is a graph of a waveform optimized for a specific ratio of pulse to reverse pulse amplitude, the ratio being 1:X;

FIG. 10 is a graph of a waveform optimized for a specific ratio of pulse to reverse pulse amplitude, the ratio being 1:<X;

FIG. 11 is a graph of a waveform optimized for a specific ratio of pulse to reverse pulse amplitude, the ratio being 1:>X;

FIG. 12 is a graph depicting voltage versus current in a traditional constant voltage/constant current power supply;

FIG. 13 is a graph depicting voltage versus current in a "constant power" power supply according to the present invention;

FIG. 14 is a graph depicting voltage versus current for a first example of a dynamic power mode of a power supply of the present invention;

FIG. 15 is a graph depicting voltage versus current for a second example of a dynamic power mode of a power supply of the present invention;

FIG. 16 is a graph depicting voltage versus current for a third example of a dynamic power mode of a power supply of the present invention;

FIG. 17 is a graph depicting voltage versus current for a fourth example of a dynamic power mode of a power supply of the present invention;

DETAILED DESCRIPTION OF THE PREFERRED EMBODIMENTS

Figure 1:
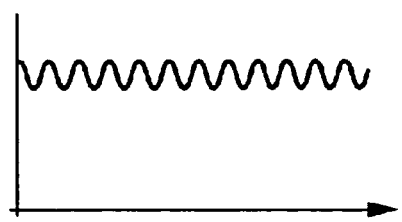
FIG. 1 is a graph depicting a first example of a controlled AC ripple on a DC signal generated by a power supply device of the present invention.
Figure 2:
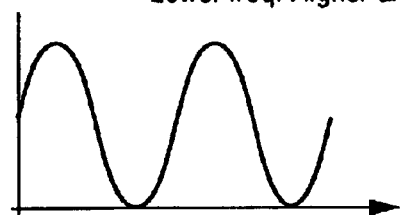
FIG. 2 is a graph depicting a second example of a controlled AC ripple on a DC signal generated by a power supply device of the present invention.
Figure 3:
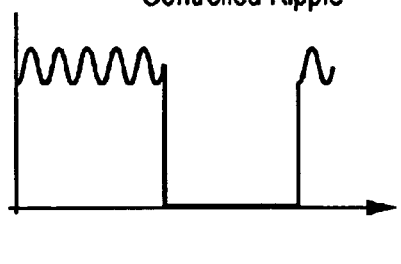
FIG. 3 is a graph depicting a first example of a controlled AC ripple on a pulse signal generated by a power supply device of the present invention.
Figure 4:
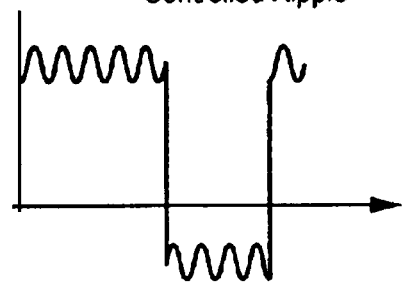
FIG. 4 is a graph depicting a second example of a controlled AC ripple on a pulse signal generated by a power supply device of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention is a power delivery device 10, which generates a controlled electrical signal for the purpose of electrochemical processing. Electrochemical processing includes electroplating, deposition by electrochemical means, electromachining, etching by electrochemical means and anodizing. However, it is to be understood that the power delivery device 10 of the present invention can also be utilized in electrical or electrolytic plating applications, or any other plating or etching application requiring precise control of an electrical signal. By controlling the electrical signal, the electrochemical process can be controlled. This, in turn, allows for plating of complex geometric parts in a uniform manner (geometric leveling) and also overcomes limitations of process conditions, e.g., chemistries between various substances involved in the plating or etching process, current, voltage, power, impedance, etc.

In a first aspect of the present invention, the power delivery device 10 is capable of controlling the AC content of an electrical signal for the purpose of controlling the electrochemical process. The input power for the power supply device of the present invention is typically AC power single phase, or three phase. The power delivery device 10 typically includes a rectifier portion 12 that converts the AC input to a DC signal. The DC signal is then modified for output to the plating electrodes of the plating apparatus. Typically, the DC signal is modified into high frequency pulses (HFPS) by a full bridge inverter. An AC component, or "ripple," remains on the modified DC signal. In typical power supply applications, this AC component that "rides on" the DC signal is further filtered or "smoothed" out. The present invention contemplates utilizing this AC component instead of filtering it out of the power signal. It has been discovered by the inventors of the present invention that a power signal that includes an AC "ripple" having a frequency greater than approximately 10 KHz, and preferably less than approximately 1 MHz, produces a superior deposit in a variety of electrochemical applications, including Chromium electroplating. Thus, the power delivery device 10 can actually provide control of the "ripple effect" for purposes of controlling the electrochemical process. Multiple AC signals can be simultaneously included and controlled with individual amplitude content. Examples of controlled AC components of DC signals as contemplated by the present invention are depicted in FIGS. 1–4. However, the present invention is not limited to the signals depicted in these figures as there are numerous other signals that can incorporate the AC "ripple" component. The AC component can be controlled and modulated by electronic circuit methods that are well known in the electronic arts.

Figure 5:
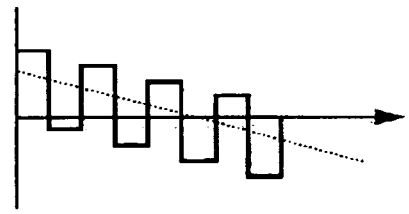
FIG. 5 is a graph of a decreasing amplitude gradient waveform utilized to modify the DC level of periodic or non-periodic pulse waveforms generated by a power supply device of the present invention.
Figure 6:
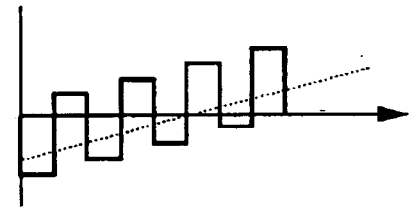
FIG. 6 is a graph of an increasing amplitude gradient waveform utilized to modify the DC level of periodic or non-periodic pulse waveforms generated by a power supply device of the present invention.
Figure 7:
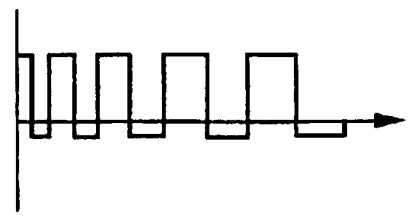
FIG. 7 is a graph of a decreasing frequency gradient waveform utilized to modify the DC level of periodic or non-periodic pulse waveforms generated by a power supply device of the present invention.
Figure 8:
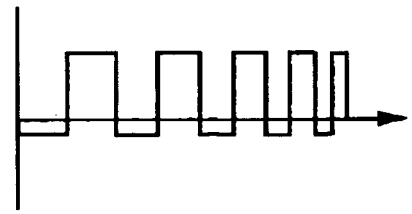
FIG. 8 is a graph of an increasing frequency gradient waveform utilized to modify the DC level of periodic or non-periodic pulse waveforms generated by a power supply device of the present invention.

In another aspect of the present invention, the power delivery device 10 is capable of creating gradient waveforms for the purpose of controlling the electrochemical process. Gradient waveforms modify the DC power level of periodic or non-periodic pulse waveforms, as shown in FIGS. 5 and 6; or modify the frequency content as shown in FIGS. 7 and 8. By controlling the power level in this way, the electrochemical process can be controlled to allow for the plating of complex geometric parts and to achieve geometric leveling. An increasing amplitude gradient waveform initially allows the plating surface to be etched (removal of material), then allows for material to be deposited. Conversely, a decreasing amplitude gradient waveform initially begins by over-plating and then subsequently etching to achieve improved leveling and deposit characteristics for complex geometries. An increasing or decreasing frequency gradient waveform may be used in electroplating, electromachining, or electropolishing wherein the specific frequencies in the varying frequency range remove burs of varying sizes. This bur removal results in a smooth surface.

In yet another aspect of the present invention, the power delivery device 10 is capable of creating uni-polar or bi-polar, e.g., reverse waveform, pulses optimized for a specific forward pulse to reverse pulse amplitude ratio. In this embodiment, the power level is determined by the pulse amplitude ratio as shown in FIGS. 9–11. FIG. 9 demonstrates a waveform set for an optimal 1:X ratio. FIGS. 10 and 11 show a waveform set for a ratio other than an optimal 1:X ratio. The forward pulse to reverse pulse amplitude ratio can be adjusted and fixed by electronic circuitry that is well known in the electronic arts.

In yet another aspect of the present invention, the power delivery device 10 provides a "constant power" power mode in addition to the traditional constant voltage/constant current modes (the outputs of which are depicted in FIGS. 12 and 13). In this particular mode, the voltage and the current are varied to maintain a constant power.

Figure 18:
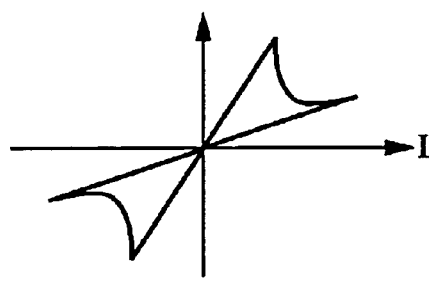
FIG. 18 is a graph depicting voltage versus current for a first example of a pulse reverse waveform generated by a power supply in dynamic power mode.
Figure 19:
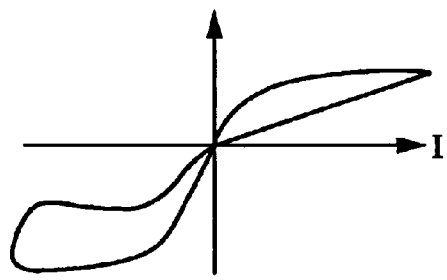
FIG. 19 is a graph depicting voltage versus current for a second example of a pulse reverse waveform generated by a power supply in dynamic power mode.

In yet another aspect of the present invention, the power delivery device 10 provides a "dynamic power mode." It has been found that controlling and modulating the power signal in a dynamic power mode (independent of voltage and current) provides a superior deposit and a more uniform plating for complex geometries and an increase in control over the pulsating diffusion layer which can be modeled as an RC circuit. The modulation of the power signal and the control of the power level allows the electrochemical process to be varied and customized according to process requirements or for specific geometric profiles. The dynamic power mode allows for customizing various portions, or zones, of the electrical signal supplied to the object to provide a more effective deposition or removal process. For example, if certain features of an object require a certain set of parameters for plating while other features require other parameters, the signal portions can each be optimized for certain specific features of the object. The electrical signals can include any number of customized portions. Examples of such signals are depicted in FIGS. 14–17. In addition, the electrical signals of the dynamic power mode may also include uni-polar and bi-polar, e.g., reverse waveform, pulses as shown in FIGS. 18 and 19. These particular waveforms allow for even greater control of an electrochemical process in certain applications. However, the present invention is not limited to the signals depicted in these figures as there are numerous other power mode variations that can be incorporated into the power supply device 10.

Figure 20:
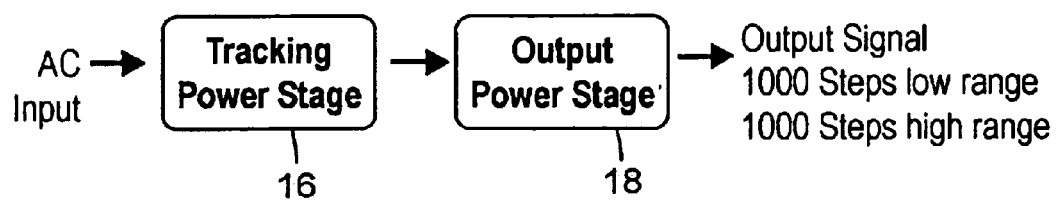
FIG. 20 is a schematic diagram depicting a dual power stage approach of the present invention that provides increased power resolution over a broader operating range.

In a preferred embodiment of the dynamic power mode, the power delivery device 10 includes two internal stages, a tracking stage 16 and an output power stage 18, as graphically depicted in FIG. 20. The first stage 16 tracks the output voltage of the second stage 18 in a feedback configuration. The first stage 16 then feeds the second stage 18 a signal that minimizes the power dissipation of the second stage. This feedback configuration allows for greater control of the electrochemical process and also provides a wider operating dynamic range of the power supply device 10 while offering increased resolution and an improved signal at the low output range. Preferably, the tracking stage 16 comprises a controller 17 and a modulator 19. A sensor 20 is operably connected to the output. The controller 17, e.g., DSP, is operably connected to the output and responsive to the sensor 20. The modulator 19 is operably connected between the controller 17 and the power stage 18 wherein the power stage outputs the electrical signal to the object in response to the modulator and the controller. Preferably, the modulator 19 is capable of modifying amplitude and frequency.

Figure 21:
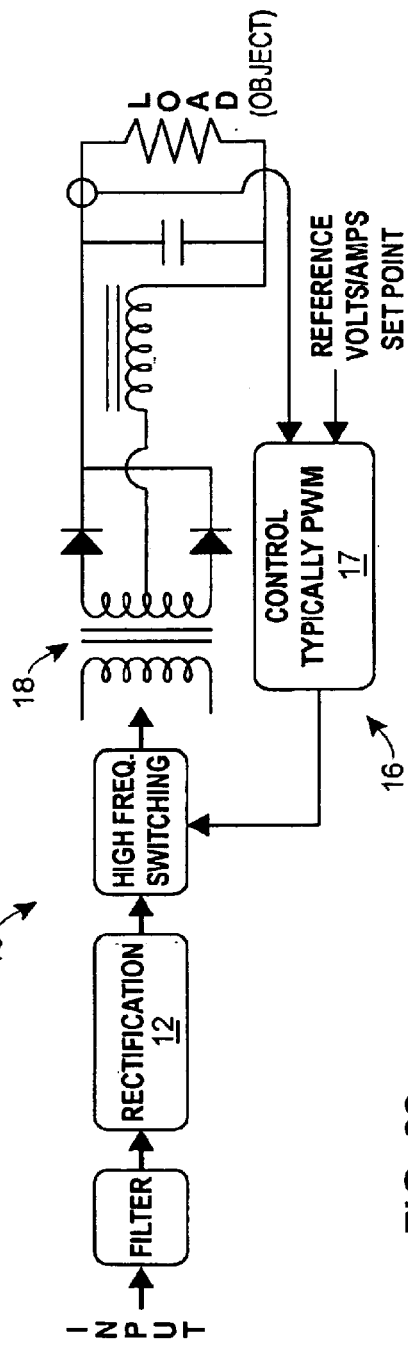
FIG. 21 is a schematic diagram of a first embodiment of a power supply device capable of generating an amplitude gradient signal according to the present invention.
Figure 22:
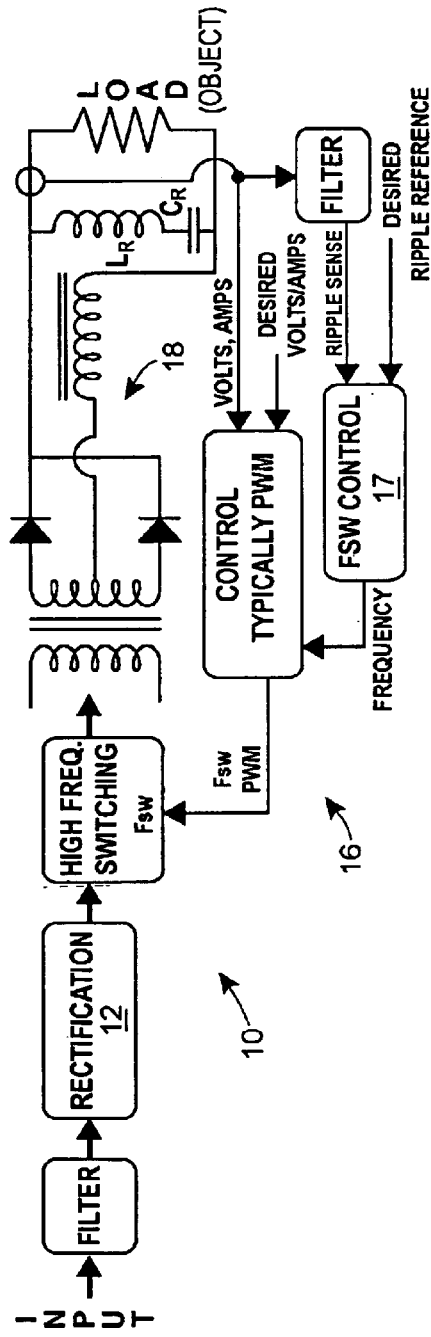
FIG. 22 is a schematic diagram of a second embodiment of a power supply device capable of generating a controlled AC ripple on a DC signal according to the present invention; and, FIG. 23 is a schematic diagram of a signal feedback arrangement that utilizes a digital signal processor to provide feedback and adjustment of a power supply device according to the present invention.

Since the power delivery device 10 utilizes a dual power stage approach, high resolution and high power can be achieved. In the preferred embodiment, the power output resolution is provided with 1000 step increments in the high range and 1000 step increments in the low range. This increased resolution allows the same power delivery device 10 to be used for both small and large plating applications. For example, with this type of resolution, the same power delivery device 10 can be used in a plating application requiring only 0.43 amps for a small surface area as well as a plating application requiring 1340 amps for a large surface area. The dual power stage configuration can be implemented by electronic circuitry methods that are well known in the electronic arts. Two particular embodiments of the power delivery device 10 of the present invention are schematically depicted in FIGS. 21 and 22.

Figure 23:
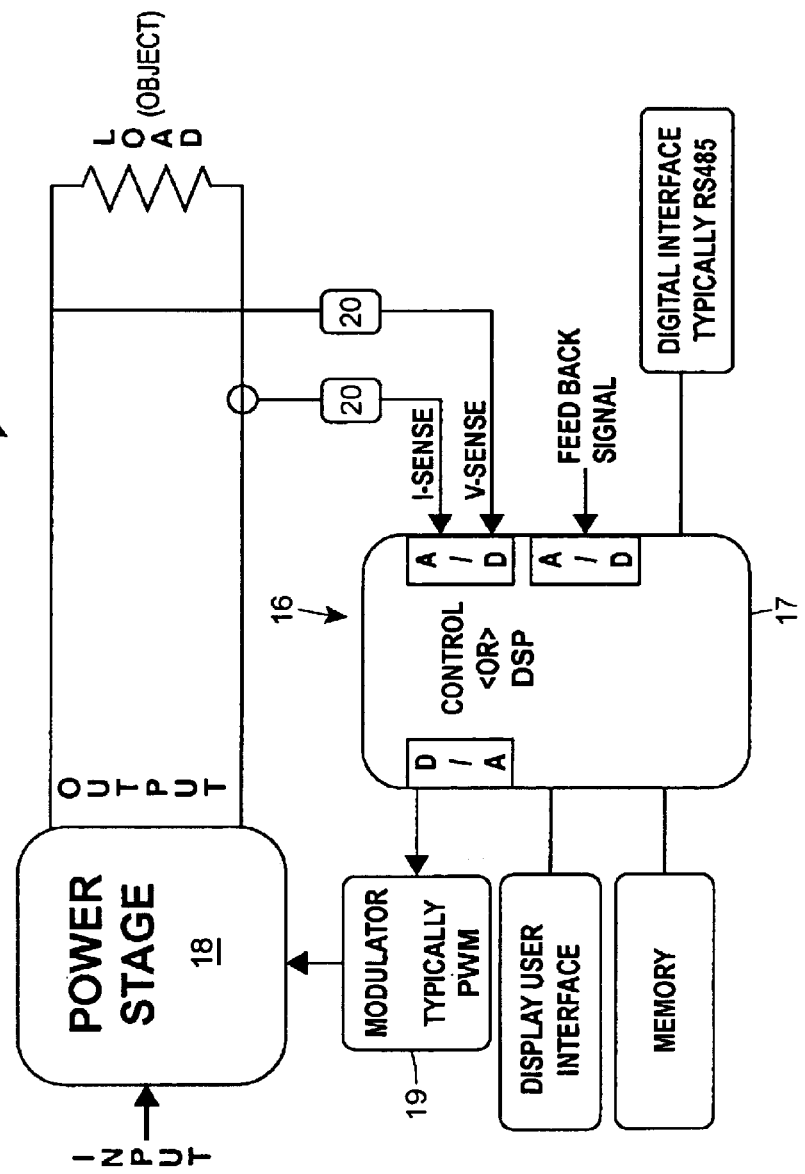

In yet another embodiment, the power delivery device 10 utilizes digital signal processor (DSP) technology for controlling the output signal and/or modulating the power signal based on feedback from the electrochemical process. An embodiment of the DSP feedback portion of the power delivery device 10 is schematically depicted in FIG. 23. A feedback control loop can be implemented between one or more sensors 20 of the plating apparatus and the power delivery device 10. Various plating and process parameters can be measured and then fed back to the power delivery device 10. By utilizing a DSP 22, the power signal can be constantly adjusted and controlled in response to the actual sensor readings to provide more precise "real-time" control over the electrochemical process. For example, the signal can be modified for controlled leveling over various geometries of the object, and to address process conditions, e.g., chemical limitations during polarity changes of the signal; or to deposit out specific alloys in a single bath composed of multiple alloys. This DSP 22 control configuration can be implemented by electronic circuitry methods that are well known in the electronic arts.

The methods and devices of the present invention provide more precise control of the electrochemical process through power control and modulation methods. Thus, the methods and devices of the present invention allow for process control and adjustment in response to the plating of complex geometries, limitations of specific chemistries of various substances, the deposit and/or removal properties of various substances and control over deposit properties.

While the specific embodiments have been illustrated and described, numerous modifications come to mind without significantly departing from the spirit of the invention, and the scope of protection is only limited by the scope of the accompanying claims.

What is claimed is:

1. A power delivery device for providing an electrical signal for an electrochemical process wherein an object is operably connected to the power delivery device, the power delivery device comprising: a tracking power stage being operably connected to the object; an output power stage providing the electrical signal having an ac component and a dc component to the object, the output power stage being operably responsive to the tracking power stage wherein a dynamic power dissipated by the output power stage is minimized.

2. The power delivery device of claim 1 wherein the tracking power stage comprises: a controller being operably connected to the output power stage, the controller having a reference parameter input wherein the controller provides an input signal to the output power stage in response to the reference parameter and the electrical signal.

3. The power delivery device of claim 2 wherein the reference parameter input is a voltage.

4. The power delivery device of claim 3 wherein the reference parameter input is a current.

5. The power delivery device of claim 2 wherein the reference parameter input is power.

6. The power delivery device of claim 2 further comprising: a frequency modulator being operably connected to the controller and the object, the frequency modulator having a first input being operably connected to the output power stage and a second input being operably connected to a ripple reference for an ac signal parameter wherein the controller is operably responsive to the output of the frequency modulator.

7. The power delivery device of claim 6 wherein the ripple reference is approximately equal to or greater than 10 kHz.

8. The power delivery device of claim 6 wherein the ripple reference is approximately equal to or less than 1 mHz.

* * * * *